United States Patent
Mortland

(10) Patent No.: US 12,258,804 B2
(45) Date of Patent: Mar. 25, 2025

(54) HINGE ASSEMBLY FOR AN AIRCRAFT DOOR

(71) Applicant: THE BOEING COMPANY, Chicago, IL (US)

(72) Inventor: Michael T. Mortland, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 242 days.

(21) Appl. No.: 17/971,857

(22) Filed: Oct. 24, 2022

(65) Prior Publication Data

US 2024/0133225 A1   Apr. 25, 2024
US 2024/0229527 A9   Jul. 11, 2024

(51) Int. Cl.
| | |
|---|---|
| *E05D 3/12* | (2006.01) |
| *E05D 5/06* | (2006.01) |
| *E05F 15/614* | (2015.01) |
| *E05F 15/63* | (2015.01) |
| *B64C 1/14* | (2006.01) |

(52) U.S. Cl.
CPC ............ *E05D 3/122* (2013.01); *E05D 3/127* (2013.01); *E05D 5/062* (2013.01); *E05F 15/614* (2015.01); *E05F 15/63* (2015.01); *B64C 1/1407* (2013.01)

(58) Field of Classification Search
CPC ......... E05D 3/122; E05D 3/127; E05D 5/062; E05D 15/28; E05D 3/022; E05F 15/614; E05F 15/63; E05F 15/53; B64C 1/1407; B64C 1/1423; E05Y 2201/62; E05Y 2201/716; E05Y 2201/722; E05Y 2800/252; E05Y 2900/502; E05Y 2900/531

See application file for complete search history.

(56) References Cited

U.S. PATENT DOCUMENTS

| | | | |
|---|---|---|---|
| 3,585,757 A | 6/1971 | Malibu | |
| 3,802,125 A | 4/1974 | Baker | |
| 4,473,201 A | 9/1984 | Barnes et al. | |
| 4,497,462 A | 2/1985 | Hamatani | |
| 4,510,714 A | 4/1985 | Kasper et al. | |
| 5,251,851 A * | 10/1993 | Herrmann | B64C 1/143 49/141 |

(Continued)

FOREIGN PATENT DOCUMENTS

CN   112478128 A   3/2021

*Primary Examiner* — Medhat Badawi
*Assistant Examiner* — Vicente Rodriguez
(74) *Attorney, Agent, or Firm* — Jay J. Hoette; The Small Patent Law Group, LLC

(57) ABSTRACT

A hinge assembly for connecting a door to a fuselage of an aircraft includes a hinge arm having a fuselage fitting pivotably coupled to a fuselage rotatable interface and a door fitting pivotably coupled to a door rotatable interface. The hinge assembly includes a programmable gear assembly coupled to the hinge arm allowing the hinge arm to pivot around the fuselage fitting when the door is moved from a door closed position to a door open position and causing the door to maintain in a generally parallel orientation relative to the fuselage between the door closed position to the door open position. The programmable gear assembly includes a fuselage gear coupled to the fuselage fitting, a door gear coupled to the door fitting, and a rack operably coupled between the fuselage gear and the door gear.

21 Claims, 11 Drawing Sheets

(56) References Cited

U.S. PATENT DOCUMENTS

| | | | |
|---|---|---|---|
| 7,357,354 B2* | 4/2008 | Mortland | B64C 1/1407 |
| | | | 244/129.4 |
| 7,578,476 B2 | 8/2009 | Wiers et al. | |
| 8,881,524 B2 | 11/2014 | Andres et al. | |
| 8,919,699 B2* | 12/2014 | Kress | B64C 1/1407 |
| | | | 244/129.4 |
| 9,725,180 B2 | 8/2017 | Hubner et al. | |
| 9,816,307 B2* | 11/2017 | Bessettes | E05F 11/54 |
| 11,066,864 B2 | 7/2021 | Bessettes et al. | |
| 2008/0216288 A1* | 9/2008 | Hoffman | E05D 3/127 |
| | | | 296/202 |
| 2008/0276428 A1* | 11/2008 | Clausen | E05D 3/122 |
| | | | 16/354 |
| 2013/0318873 A1* | 12/2013 | Knijnenburg | E05F 15/614 |
| | | | 49/31 |
| 2016/0083071 A1 | 3/2016 | Pichmaier et al. | |
| 2022/0135201 A1 | 5/2022 | Mortland | |
| 2022/0145685 A1 | 5/2022 | Mortland | |

* cited by examiner

HINGE ASSEMBLY FOR AN AIRCRAFT DOOR

BACKGROUND

The subject matter herein relates generally to aircraft doors.

An important part of any door assembly is the hinge assembly that connects the door to the adjacent aircraft fuselage structure. One particular type of hinge assembly is arranged so that, when the door is opened, the door physically separates from the surrounding structure and is translated out and away from the body while the door itself maintains a relatively parallel orientation to the longitudinal axis of the aircraft fuselage. The hinge also translates the door forward to provide a clear opening into the aircraft as the door swings away from the body. When the door is completely open, the inside face of the door is adjacent the outer skin of the aircraft.

Many hinge assemblies used with translating-motion-type aircraft doors include both a structural hinge for securing the door to the aircraft and a mechanical linkage that provides a second door-to-fuselage connection. The mechanical linkage is employed to control the rotational orientation of the door along its vertical axis so that, as the door is moved away from the fuselage, the door remains generally parallel to the outer skin of the aircraft. If the movement of the door was not controlled, the door would swing free at the end of the hinge and be difficult to maneuver and/or strike the outer skin of the fuselage. The mechanical linkage used in conventional door assemblies is typically bulky and extends a considerable distance into the interior of the fuselage. The space occupied by the mechanical linkage limits availability of such space for other purposes, such as for stowage, seating, or other purposes.

What is needed is a low profile hinge assembly for connecting a door to a fuselage of an aircraft.

BRIEF DESCRIPTION

In one embodiment, a hinge assembly for connecting a door to a fuselage of an aircraft is provided. The hinge assembly includes a hinge arm having a fuselage fitting at a first end and a door fitting at a second end. The fuselage fitting is configured to be pivotably coupled to a fuselage rotatable interface mounted to the fuselage adjacent a door opening of the aircraft. The door fitting is configured to be pivotably coupled to a door rotatable interface of the door. The hinge assembly includes a programmable gear assembly coupled to the hinge arm. The programmable gear assembly is configured to allow the hinge arm to pivot around the fuselage fitting when the door is moved from a door closed position to a door open position. The programmable gear assembly is further configured to cause the door to maintain in a generally parallel orientation relative to a longitudinal axis of the fuselage as the door moves from the door closed position to the door open position. The programmable gear assembly includes a fuselage gear coupled to the fuselage fitting, a door gear coupled to the door fitting, and a rack operably coupled between the fuselage gear and the door gear.

In another embodiment, a hinge assembly for connecting a door to a fuselage of an aircraft is provided. The hinge assembly includes a hinge arm having a fuselage fitting at a first end and a door fitting at a second end. The fuselage fitting is configured to be pivotably coupled to a fuselage rotatable interface mounted to the fuselage adjacent a door opening of the aircraft. The door fitting is configured to be pivotably coupled to a door rotatable interface of the door. The hinge assembly includes a programmable gear assembly coupled to the hinge arm. The programmable gear assembly is configured to allow the hinge arm to pivot around the fuselage fitting when the door is moved from a door closed position to a door open position. The programmable gear assembly is further configured to cause the door to maintain in a generally parallel orientation relative to a longitudinal axis of the fuselage as the door moves from the door closed position to the door open position. The programmable gear assembly includes a fuselage gear coupled to the fuselage fitting, a door gear coupled to the door fitting, and a rack operably coupled between the fuselage gear and the door gear. The fuselage gear is adjustable relative to the rack and the door gear for tensioning the programmable gear assembly.

In a further embodiment, a hinge assembly for connecting a door to a fuselage of an aircraft is provided. The hinge assembly includes a hinge arm having a fuselage fitting at a first end and a door fitting at a second end. The fuselage fitting is configured to be pivotably coupled to a fuselage rotatable interface mounted to the fuselage adjacent a door opening of the aircraft. The door fitting is configured to be pivotably coupled to a door rotatable interface of the door. The hinge assembly includes a programmable gear assembly coupled to the hinge arm. The programmable gear assembly is configured to allow the hinge arm to pivot around the fuselage fitting when the door is moved from a door closed position to a door open position. The programmable gear assembly is further configured to cause the door to maintain in a generally parallel orientation relative to a longitudinal axis of the fuselage as the door moves from the door closed position to the door open position. The programmable gear assembly includes a fuselage gear coupled to the fuselage fitting, a door gear coupled to the door fitting, and a rack operably coupled between the fuselage gear and the door gear. An emergency power assist assembly attached between the programmable gear assembly and the hinge arm so as to drive the door open in an emergency, and to limit the speed of the motion of the hinge arm when the hinge arm is moved between the door closed position to the door open position.

DETAILED DESCRIPTION

Figure 1:
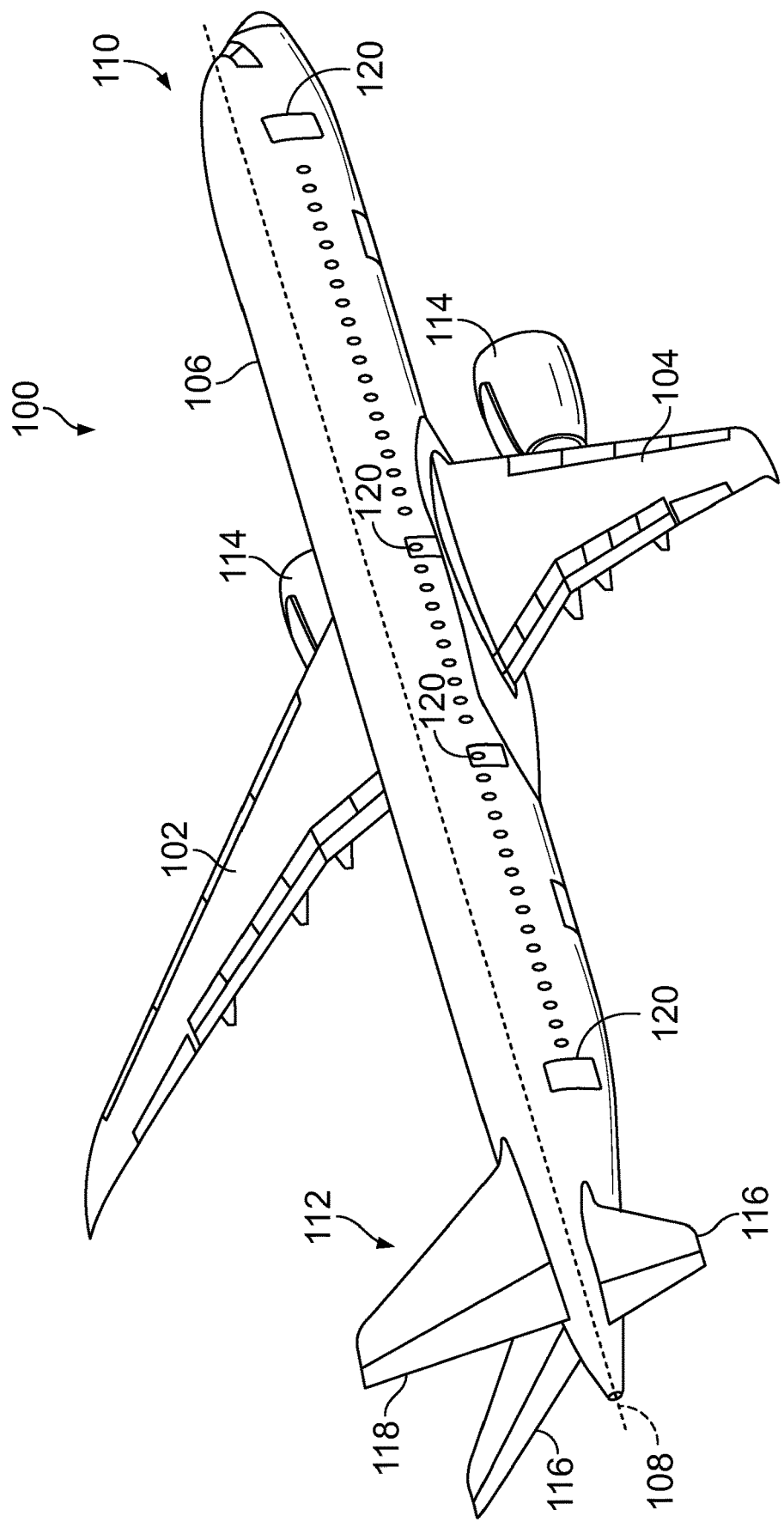
FIG. 1 illustrates an aircraft in accordance with an exemplary embodiment.

FIG. 1 illustrates an aircraft 100 in accordance with an exemplary embodiment. The aircraft 100 has wings 102, 104 attached to a fuselage 106. The fuselage 106 extends along a longitudinal axis 108 between a nose section 110 at the front of the aircraft 100 and a tail section 112 at the rear of the aircraft 100. The aircraft 100 includes engines 114 attached to the wings 102, 104. The fuselage 106 has horizontal stabilizers 116 and a vertical stabilizer 118 at the tail section 112.

A passenger cabin is present in the fuselage 106 of the aircraft 100. The passenger cabin is part of a pressure-controlled interior in fuselage 106 of aircraft 100. Doors 120 are present in fuselage 106 to provide access to the passenger cabin. The doors 120 may be passenger entry/exit doors used for loading and unloading passengers. The doors 120 may be emergency doors, such as over the wings 102, 104. One or more of the doors 120 are attached to the fuselage 106 using hinge assemblies 200 (shown in FIG. 2) in accordance with exemplary embodiments.

Figure 2:
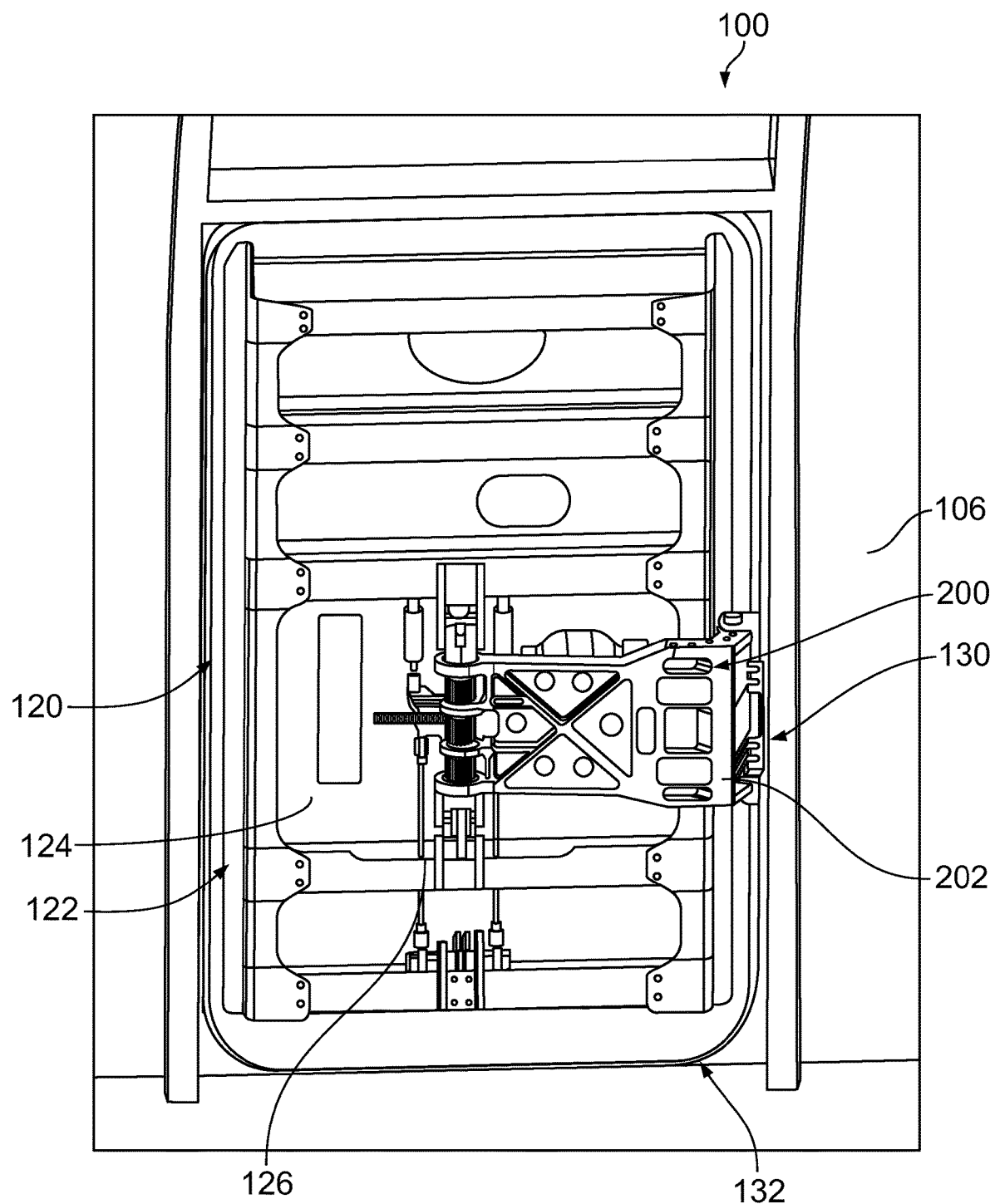
FIG. 2 illustrates a hinge assembly used for connecting the door to the fuselage of the aircraft in accordance with an exemplary embodiment.

FIG. 2 illustrates a hinge assembly 200 used for connecting the door 120 to the fuselage 106 of the aircraft 100 in accordance with an exemplary embodiment. FIG. 2 illustrates a door structure 122 and a door skin 124 of the door 120. An interior lining or interior cosmetic panel (not shown) is removed to illustrate the door structure 122 and the hinge assembly 200. The door structure 122 includes vertical frame members, such as at the exterior or edge and horizontal beam members across the interior to form the door structure 122. The hinge assembly 200 includes components which allow it to perform in its intended manner. Many of these components are common to mechanical systems, such as pins, fasteners, brackets and the like. The following description shall describe selected components and their arrangement and combination needed to understand the structure and operation of the hinge assembly 200. The door 120 is shown in a door closed position in FIG. 2.

The hinge assembly 200, includes a hinge arm or hinge arm 202 which provides the structural support member that connects the door 120 to the fuselage 106. The hinge arm pivots at both ends and supports the door 120 through a range of motion. In an exemplary embodiment, the hinge arm 202 includes two primary pivot points: 1) between the hinge arm 202 and the door 120 and 2) between hinge arm 202 and the fuselage 106.

The hinge assembly 200 is connected to the door structure 122 at a door rotatable interface 126 of the door structure 122. In an exemplary embodiment, the door 120 is pivotably coupled to the door rotatable interface 126 and pivots relative to the door rotatable interface 126 as the door 120 is opened and closed. In various embodiments, the door rotatable interface 126 is located approximately centered on the door 120, such as being vertically centered and/or horizontally centered on the door 120.

The hinge assembly 200 is connected to the fuselage 106 at a fuselage rotatable interface 130 mounted to the fuselage 106 adjacent a door opening 132. A pressure seal may surround the door opening 132. The door 120 is used to provide closure to the door opening 132. In an exemplary embodiment, the door 120 is pivotably coupled to the fuselage rotatable interface 130 and pivots relative to the fuselage rotatable interface 130 as the door 120 is opened and closed.

Figure 3:
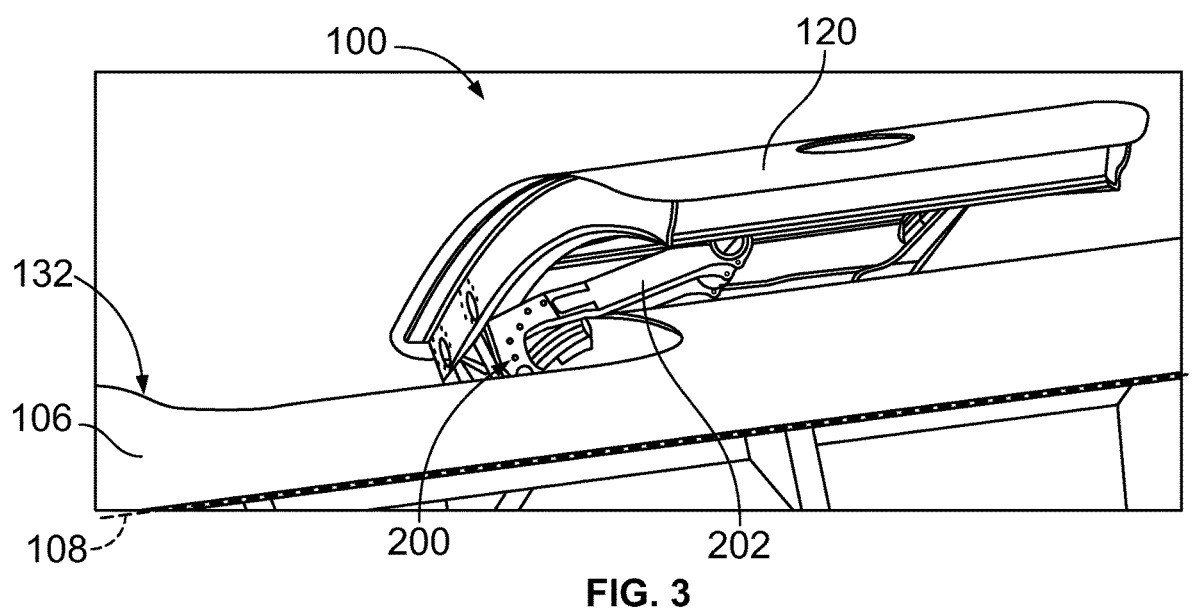
FIG. 3 illustrates the hinge assembly used for connecting the door to the fuselage of the aircraft in accordance with an exemplary embodiment.

FIG. 3 illustrates the hinge assembly 200 used for connecting the door 120 to the fuselage 106 of the aircraft 100 in accordance with an exemplary embodiment. The door 120 is shown in a door open position in FIG. 3. The hinge assembly 200 is configured to cause the door 120 to move along a programed path. For example, the hinge assembly 200 may cause the door 120 to maintain in a generally parallel orientation relative to the longitudinal axis 108 of the fuselage 106 as the door 120 moves from the door closed position to the door open position. In other various embodiments, the door 120 may be over-rotated or under-rotated to change the orientation of the door 120 and follow the tapered section of the fuselage. For example, the door 120 may be over-rotated to angle the front edge of door 120 inward or the door 120 may be under-rotated to angle front edge of the door 120 outward. When the door 120 is fully opened, the inside of the door 120 is adjacent the outer skin of the aircraft 100. The hinge assembly 200 maintains the parallel orientation of the door 120 while the door 120 has been translated out away from, and forward of, the door opening 132 in the fuselage 106. The hinge arm 202 of the hinge assembly 200 is L-shaped to hold the door 120 outward of the outer skin of the aircraft 100. The L-shaped nature of the hinge arm 202 creates the hinge elbow 222 in the member which is present to accommodate the shape of the fuselage 106 around the door opening 132 in order to position the door 120 close to the outer skin of the fuselage 106 in the door open position. The L-shaped hinge elbow formed by the hinge arm 202 receives a portion of the fuselage 106 around the door opening 132 to position the door close to the outer skin of the fuselage 106 in the door open position.

Figure 4:
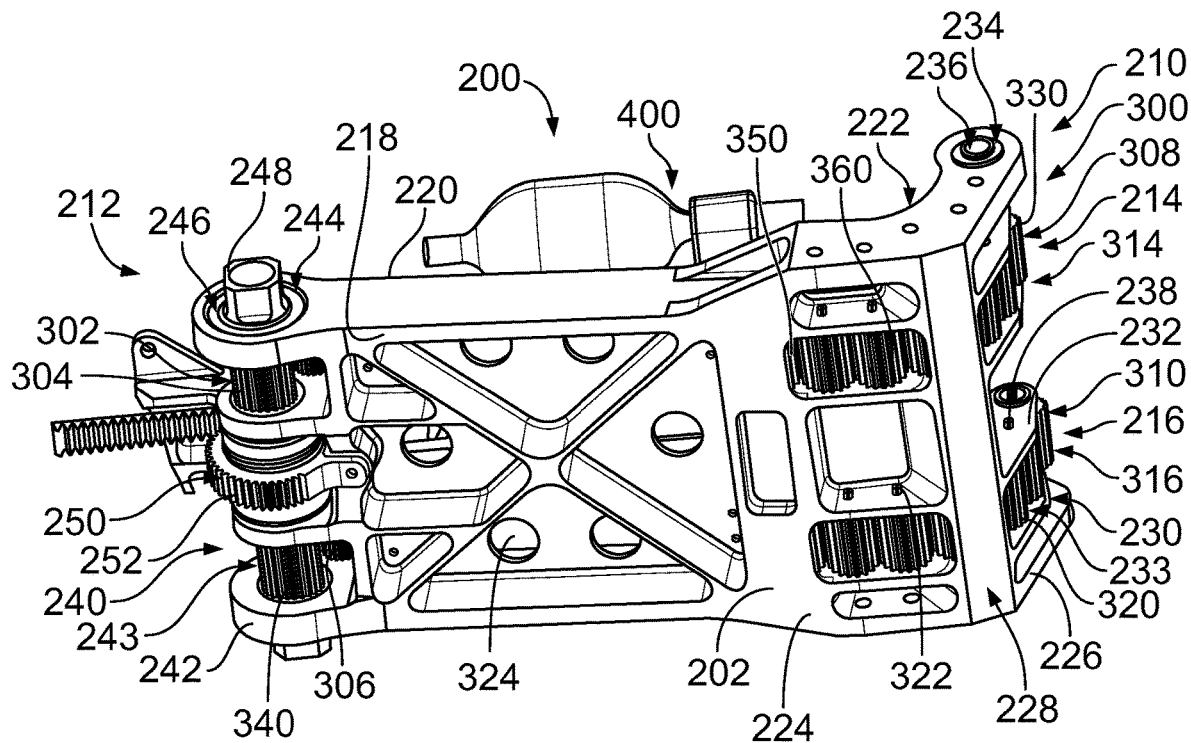
FIG. 4 is a front perspective view of the hinge assembly in accordance with an exemplary embodiment.
Figure 5:
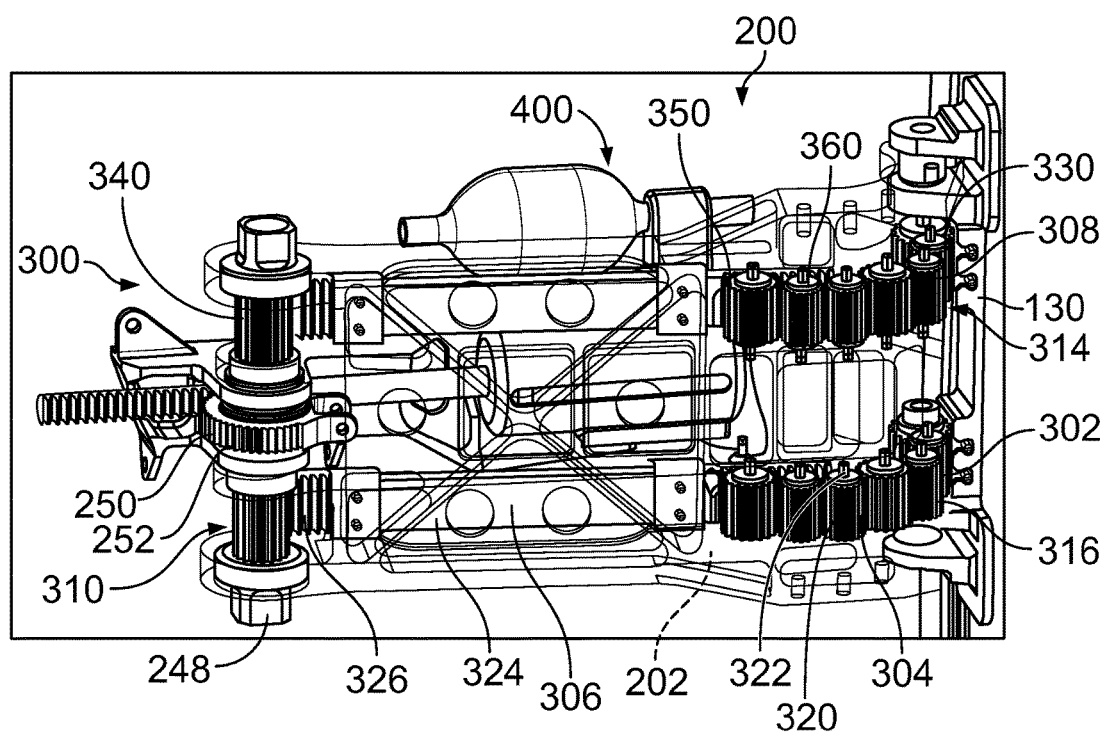
FIG. 5 is a front perspective view of the hinge assembly in accordance with an exemplary embodiment with the hinge arm shown in phantom to illustrate components of the hinge assembly.

FIG. 4 is a front perspective view of the hinge assembly 200 in accordance with an exemplary embodiment. FIG. 5 is a front perspective view of the hinge assembly 200 in accordance with an exemplary embodiment with the hinge arm 202 shown in phantom to illustrate components of the hinge assembly 200.

The hinge assembly 200 includes the hinge arm 202, a programmable gear assembly 300 coupled to the hinge arm 202, and an emergency power assist assembly 400 attached between the programmable gear assembly 300 and the hinge arm 202. The emergency power assist assembly 400 is used to assist opening of the door 120 in an emergency. For example, the emergency power assist assembly 400 includes a power driven actuator used to push against the door 120 in an opening direction to assist opening the door 120 in an emergency. The emergency power assist assembly 400 may be used to limit the speed of the motion of the hinge arm 202 when the hinge arm 202 is moved between the door closed position to the door open position (for example, to dampen the opening speed or the closing speed). In various embodiments, the emergency power assist assembly 400 is coupled to the door rotatable interface 126.

In an exemplary embodiment, the programmable gear assembly 300 includes a plurality of gear elements 302 including gears 304 and racks 306. Other types of gear elements may be provided in other embodiments. In various embodiments, the gears 304 may be arranged in gear sets 308. The racks 306 extend between corresponding gears 304 and/or gear sets 308 to transfer rotation between the gears 304 and/or the gear sets 308.

The programmable gear assembly 300 is configured to allow the hinge arm 202 to pivot around the fuselage rotatable interface 130 (FIG. 5) when the door 120 is moved from the door closed position to the door open position. The programmable gear assembly 300 is configured to cause the door 120 to move along a programed path, such as to maintain in a generally parallel orientation relative to the longitudinal axis 108 of the fuselage 106 as the door 120 moves from the door closed position to the door open position. The programmable gear assembly 300 controls the orientation of the door 120 through the opening/closing movements. The geometry of the components of the programmable gear assembly 300 has been tailored to yield a desired or controlled motion (i.e. Programmed). The sizing, positioning, and orientations of the components of the programmable gear assembly 300 contribute to the programmability of hinge assembly 200. For example, providing gears having the same gear ratio maintains a parallel orientation. However, changing gear ratios may allow angling of the door inward or outward, such as to follow a taper of the fuselage, in the open position. Generally, the rotational and translational motions of the components of the programmable gear assembly 300 are transmitted through the various components to control the opening and closing of the door 120 relative to the fuselage 106.

The hinge arm 202 extends between a first end 210 and a second end 212. In an exemplary embodiment, the hinge arm 202 is a single, unitary metal component, such as an aluminum body manufactured into a desired shape. In various embodiments, the hinge arm 202 is a machined part. The hinge arm 202 may be a determinant part having predrilled openings to receive other components, such as the programmable gear assembly 300. Portions of the metal body are removed to reduce weight of the hinge arm 202. The hinge arm 202 includes an upper portion 214 at a top of the hinge arm 202 and a lower portion 216 at a bottom of the hinge arm 202. The hinge arm 202 includes an inner surface 218 and an outer surface 220. The outer surface 220 is configured to face the door 120. In various embodiments, a cosmetic cover or lining (not shown) may be attached to the inner surface 218, which is exposed to the interior of the passenger cabin. The hinge arm 202 has a footprint or envelope defined between the first end 210 and the second end 212 and defined between the inner surface 218 and the outer surface 220. In an exemplary embodiment, the programmable gear assembly 300 is generally contained within the footprint or envelope so as to reduce the overall space occupied by the hinge assembly 200. As such, the hinge assembly 200 has a low-profile and does not occupy significant space outside of the hinge arm 202, thus leaving such space for other aircraft components within the passenger cabin (for example, for passenger seating or galley workspace).

In the illustrated embodiment, the hinge arm 202 is generally L-shaped having two primary sections with a bend in the middle. The hinge arm 202 has a hooked or curved profile extending outward at the first end 210 forming a hinge elbow 222 along the outer surface 220. For example, the hinge arm 202 includes a main body 224 and an extension 226 extending from the main body 224 at a corner 228 to form the hinge elbow 222. The extension 226 is provided at the first end 210. The extensions 226 extends outward from the main body 224, such as toward the exterior of the aircraft 100. In various embodiments, the extension 226 may extend generally perpendicular from the main body 224. In other various embodiments, the extensions 226 may extend at other angles, such as at an obtuse angle. The hinge arm 202 may follow a curved path at the corner 228 between the main body 224 and the extension 226.

The hinge arm 202 includes a fuselage fitting 230 at the first end 210. The fuselage fitting 230 is part of the extension 226. The fuselage fitting 230 is configured to be pivotably coupled to the fuselage rotatable interface 130. In an exemplary embodiment, the fuselage fitting 230 includes lugs 232 having openings 234. The openings 234 receive bearings 236 and pins 238 that connect the fuselage fitting 230 to the fuselage rotatable interface 130. Other types of connection elements may be provided at the fuselage fitting 230 to pivotably coupled to the fuselage fitting 230 to the fuselage rotatable interface 130. The lugs 232 may have channels 233 that receive other components, such as components of the programmable gear assembly 300. The channels 233 may be open at the inner surface 218 and/or the outer surface 220. The channels 233 may extend along the main body 224 and/or the extensions 226. The channels 233 may be open at the first end 210.

The hinge arm 202 includes a door fitting 240 at the second end 212. The door fitting 240 is part of the main body 224. The door fitting 240 is configured to be pivotably coupled to the door rotatable interface 126. In an exemplary embodiment, the door fitting 240 includes lugs 242 having openings 244. The openings 244 receive bearings 246 and a shaft 248 that connects the door fitting 240 to the door rotatable interface 126. In an exemplary embodiment, movement of the door 120 causes rotation of the shaft 248, which may be transferred to the programmable gear assembly 300. Other types of connection elements may be provided at the door fitting 240 to pivotably coupled to the door fitting 240 to the door rotatable interface 126. The lugs 242 may have channels 243 that receive other components, such as components of the programmable gear assembly 300. The channels 243 may be open at the inner surface 218 and/or the outer surface 220. The channels 243 may be open at the second end 212.

In an exemplary embodiment, a drive gear 250 is coupled to the main body 224 of the hinge arm 202. The drive gear 250 includes gear teeth 252 that interface with a drive rack 410. The drive gear 250 is rotated by the drive rack 410 as the piston rod 412 is retracted by the actuator 402 of the emergency power assist assembly 400. The input torque from the emergency power assist assembly 400 through the drive gear 250 pushes the hinge arm 202 open. An opposing force is provided by the frame of the emergency power assist assembly 400, through one or more rollers, into the door structure 122. In an exemplary embodiment, the emergency power assist assembly 400 includes a roller or slotted interface as the door 120 is lifted while the emergency power assist assembly 400 stays with the hinge. The emergency power assist assembly 400 can drive the drive gear 250 and thereby force the hinge arm 202 to rotate or the rotation of the hinge arm 202 can force the piston of the emergency power assist assembly 400 to move, in which case the emergency power assist assembly 400 acts as a motion damper. As the emergency power assist assembly 400 forces the hinge arm 202 to move (open) relative to the door 120, the programming gear assembly 300 (which maintains an angular relationship between the fuselage edge frame and the door) causes the door 120 to open out of the cutout. The emergency power assist assembly 400 operates as a force element operable between the hinge arm 202 and the door 120. Since there is a rotational coupling (programming gear set) between the hinge-to-fuselage joint and the door-to-hinge joint, the forceful opening of the joint between the hinge and door via the emergency power assist assembly 400 causes an equal rotational motion between the hinge and fuselage and thus causes the door 120 to open out of the cutout.

In an exemplary embodiment, the programmable gear assembly 300 includes at least one gear train 310 extending between the fuselage fitting 230 and the door fitting 240. In the illustrated embodiment, the programmable gear assembly 300 includes a pair of the gear trains 310, namely an upper gear train 314 and a lower gear train 316. The upper gear train 314 is provided along the upper portion 214 of the hinge arm 202. The lower gear train 316 is provided along the lower portion 216 of the hinge arm 202. The upper gear train 314 is connected to the lower gear train 316 by the shaft 248 to form a continuous gear train. In an exemplary embodiment, the upper gear train 314 and the lower gear train 316 are identical (for example, include identical components). In an exemplary embodiment, the gear trains 314, 316 have the same gear teeth counts and/or overall gear ratios. However, the gear trains 314, 316 may have different gear ratios in alternative embodiments, such as to control the opening/closing motion and to control the orientation of the door 120 in the parked or fully open position. In an exemplary embodiment, the gear trains 314, 316 are parallel.

Each gear 304 is a generally cylindrical structure having gear teeth 320 along the exterior surface of the gear 304. The gear 304 is coupled to the hinge arm 202 using pins 322 that extend from the top and the bottom of the gear 304. The gear 304 is rotatable relative to the hinge arm 202. Each rack 306 includes a slide 324 extending between opposite first and second ends. The rack 306 includes rack teeth 326 along the slide 324 configured to interface with the corresponding gears 304. The rack 306 is configured to translate (for example slide) side-to-side to transfer motion to the corresponding gears 304. For example, when one of the gears 304 is rotated, the rack 306 moves causing the other gear 304 to rotate. As such, rotational motion of the gears 304 is transferred to translational motion of the rack 306, and vice versa. In various embodiments, the rack 306 may be mounted to one of the sides of the hinge arm 202, such as the outer surface 220. In other various embodiments, the rack 306 may be received within an interior channel or slot formed in the hinge arm 202.

The gear train 310 includes the rack 306 and a plurality of the gears 304 operably coupled to the rack 306. In various embodiments, the gear train 310 may include a single gear 304 at one or both ends of the rack 306. In other various embodiments, the gear train 310 may include multiple gears 304 at one or both ends of the rack 306. In an exemplary embodiment, the gear train 310 includes a fuselage gear 330 coupled to the fuselage fitting 230, a door gear 340 coupled to the door fitting 240, and the rack 306 operably coupled between the fuselage gear 330 and the door gear 340. In the illustrated embodiment, the door gear 340 is directly coupled to the rack 306, however, the fuselage gear 330 is indirectly coupled to the rack 306 through other gears 304. For example, the gear train 310 includes a rack drive gear 350 and at least one intermediary gear 360 between the fuselage gear 330 and the rack drive gear 350. In the illustrated embodiment, the gear train 310 includes five of the intermediary gears 360. The fuselage gear 330, the rack drive gear 350, and the intermediary gears 360 form the gear set 308. For example, the fuselage gear 330, the rack drive gear 350, and the intermediary gears 360 are arranged in series configured to directly drive each other through the series of the gears 304. The gear train 310 may include greater or fewer gears 304 in alternative embodiments. The door gear 340 may be part of a gear set in alternative embodiments having additional gears 304 between the door gear 340 and the rack 306 (for example, a rack drive gear and/or intermediary gears).

Figures 6, 7:
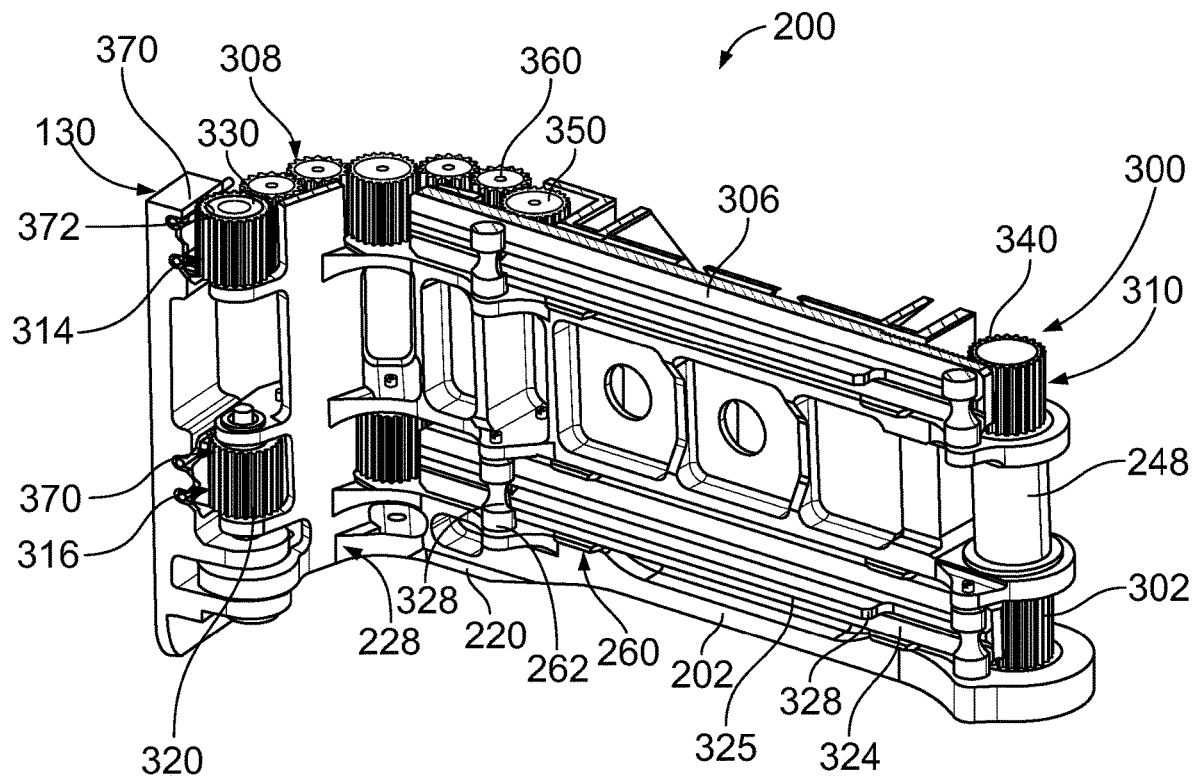
FIG. 6 is a sectional, rear perspective view of the hinge assembly in accordance with an exemplary embodiment showing the hinge assembly coupled to the fuselage rotatable interface.
FIG. 7 is a sectional, front perspective view of the hinge assembly in accordance with an exemplary embodiment.

FIG. 6 is a sectional, rear perspective view of the hinge assembly 200 in accordance with an exemplary embodiment showing the hinge assembly coupled to the fuselage rotatable interface 130. FIG. 7 is a sectional, front perspective view of the hinge assembly 200 in accordance with an exemplary embodiment.

The rack 306 is received in a guide bracket 260 of the hinge arm 202 at the outer surface 220. The guide bracket 260 may be C-shaped forming a channel that receives the rack 306. The upper and lower walls of the guide bracket 260 are located above and below the rack 306 to position the rack 306 within the guide bracket 260. Upper and lower edges of the rack 306 define slide surfaces that slide along the upper and lower walls of the guide bracket 260. Guide rollers 262 are used to facilitate translational movement of the rack 306. The guide rollers 262 presses the rack 306 into engagement with the gears and maintain gear teeth engagement. In an exemplary embodiment, the rack 306 includes a rack stiffener 325 that interfaces with the guide rollers 262. The rack stiffener 325 extends along the side of the slide 324 to stiffen the rack 306. The rack stiffener 325 is received in the concave or radial section at the center of the guide roller 262. The rack stiffener 325 includes one or more stop shoulders 328 that engage the guide rollers 262 and limit translational movement of the rack 306 relative to the guide rollers 262. For example, the rack 306 may move in one direction until one of the stop shoulders 328 engages the corresponding guide roller 262 or may move in the opposite direction until another of the stop shoulders 328 engages the corresponding guide roller 262. The stop shoulders 328 confine the movement of the rack 306.

In an exemplary embodiment, the programmable gear assembly 300 includes a fuselage rack 370 (FIG. 6) at the fuselage rotatable interface 130. The fuselage gear 330 is operably coupled to the fuselage rack 370. In an exemplary embodiment, the fuselage gear 330 directly engages the fuselage rack 370. For example, the gear teeth 320 of the fuselage gear 330 interface with rack teeth of the fuselage rack 370. Opening and closing of the door 120 causes pivoting of the hinge arm 202 relative to the fuselage rotatable interface 130. The movement of the hinge arm 202 around the fuselage rotatable interface 130 drives the first gear of the gear set 308 to rotate as it travels around the stationary fuselage gear 330. The rotation, initiated by the stationary fuselage gear 330 into gear set 308 as the hinge arm 202 is rotated, is transferred to rack 306 and subsequently transferred by the rack 306 to the door gear 340.

In the illustrated embodiment, the gear train 310 includes the fuselage gear 330, a plurality of the intermediary gears 360, the rack drive gear 350, the rack 306, and the door gear 340. The gear train 310 includes the rack 306 between the rack drive gear 350 and the door gear 340. Rotation of the door gear 340 is transferred by the rack 306 to the rack drive gear 350 and/or rotation of the rack drive gear 350 is transferred by the rack 306 to the door gear 340. The rotation of the rack drive gear 350 is transferred via the intermediary gears 360 to the fuselage gear 330 and/or the rotation of hinge arm 202 via the intermediary gears 360 around the stationary fuselage gear 330 is transferred via the intermediary gears 360 to the rack drive gear 350. As such, rotation of the door gear 340 causes rotation of the hinge arm 202, and vice versa. The gear train 310 is used to control motion of the hinge arm 202. For example, the gear train 310 controls pivoting of the hinge arm 202 relative to the fuselage rotatable interface 130 and controls pivoting of the hinge arm 202 relative to the door rotatable interface 126. The programmable movement of the hinge assembly 200 may maintain the door 120 in the parallel orientation relative to the longitudinal axis 108 of the fuselage 106. However, the programmable gear assembly 300 may be programed to over-rotate or under-rotate the door 120 to change the orientation of the door 120.

In the illustrated embodiment, the gear train 310 includes five of the intermediary gears 360 between the fuselage gear 330 and the rack drive gear 350 forming the gear set 308. The gear set 308 extends along a curved gear path following the curvature of the hinge arm 202 at the corner 228. The gear set 308 is operably coupled to the fuselage rotatable interface 130 and to the rack 306. In an exemplary embodiment, the fuselage gear 330 and the rack drive gear 350 have a common diameter and an equivalent number of gear teeth 320. As such, the fuselage gear 330 and the rack drive gear 350 rotate at the same rate. In various embodiments, one or more of the intermediary gears 360 may have a different diameter than the fuselage gear 330 and the rack drive gear 350. The diameters of the intermediary gears 360 may be selected for weight saving and/or form-fitting to the curvature of the hinge arm 202. The gear set 308 is operably coupled to the door gear 340 through the rack 306. In an exemplary embodiment, the rack drive gear 350 and the door gear 340 have a common diameter and an equivalent number of gear teeth 320. As such, the rack drive gear 350 and the door gear 340 rotate at the same rate. In an exemplary embodiment, because the door gear 340 and the fuselage gear 330 have a common diameter, the door gear 340 and the fuselage gear 330 rotate at the same rate to maintain the door 120 in a parallel orientation relative to the longitudinal axis 108 of the fuselage 106. However, changing gear ratios may allow angling of the door inward or outward, such as to follow a taper of the fuselage, in the open position.

In an exemplary embodiment, the upper and lower gear trains 314, 316 are arranged in parallel. The upper and lower door gears 340 of the upper and lower gear trains 314, 316 are both connected to the shaft 248. Rotation of the shaft 248 causes rotation of both the upper and lower door gears 340. The upper and lower fuselage gears 330 of the upper and lower gear trains 314, 316 are both connected to the fuselage rotatable interface 130 by the corresponding fuselage racks 370. As such, the gear elements 302 of the upper and lower gear trains 314, 316 operate in unison with each other to control motion of the hinge arm 202. The programmed motion of the hinge arm 202 orients the door 120 relative to the fuselage 106 during opening and closing.

Figure 8:
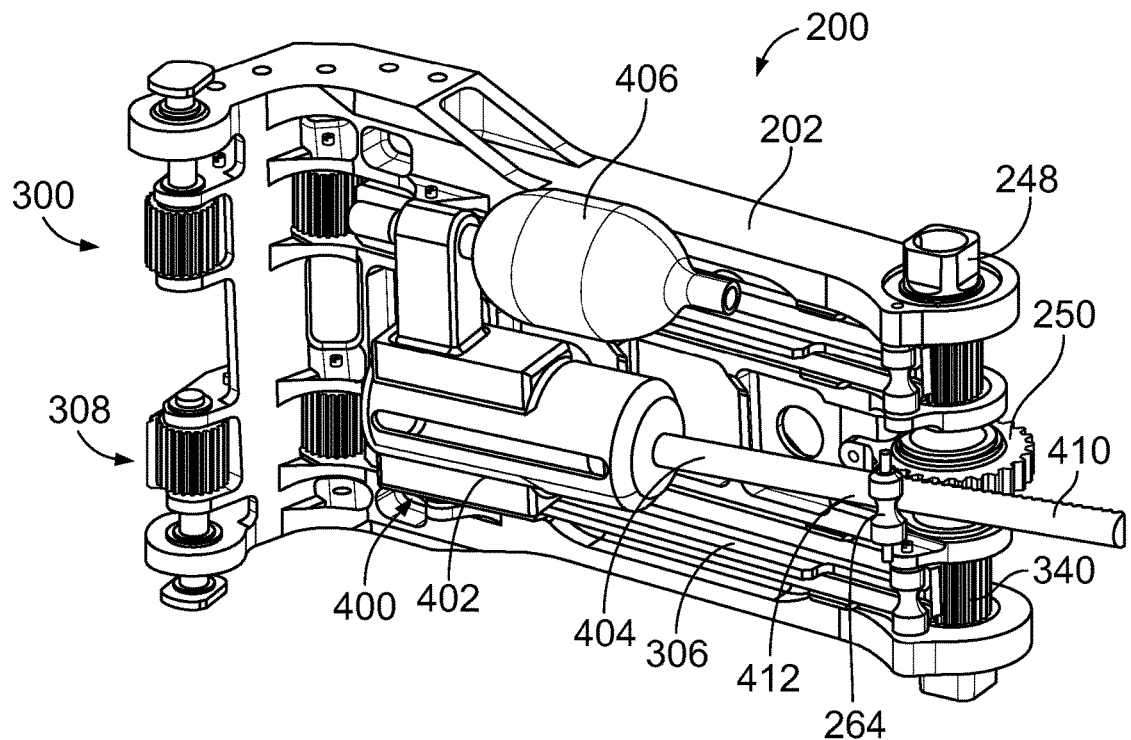
FIG. 8 is a rear perspective view of the hinge assembly showing an emergency power assist assembly in accordance with an exemplary embodiment.
Figure 9:
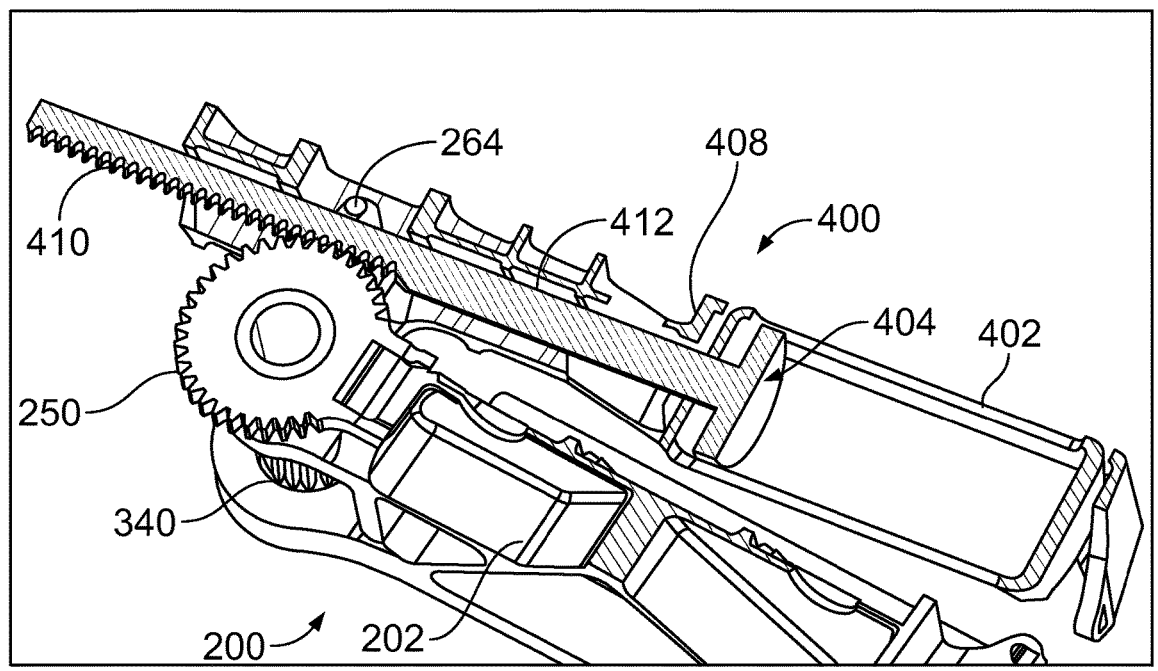
FIG. 9 is a sectional, front perspective view of a portion of the hinge assembly showing the emergency power assist assembly in accordance with an exemplary embodiment.

FIG. 8 is a rear perspective view of the hinge assembly 200 showing the emergency power assist assembly 400 in accordance with an exemplary embodiment. FIG. 9 is a sectional, front perspective view of a portion of the hinge assembly 200 showing the emergency power assist assembly 400 coupled to the hinge arm 202.

The emergency power assist assembly 400 includes an actuator 402 and a piston 404 operably coupled to the actuator 402. The emergency power assist assembly 400 includes a pressure bottle 406 holding a pressurized gas, which is operably coupled to the actuator 402. The actuator 402 is coupled to a mounting frame 408 (FIG. 9), which is coupled to the door 120. The actuator 402 is used to move the piston 404 between a retracted position and an extended position (FIG. 8). For example, in an emergency situation, the high-pressure gas in the pressure bottle 406 is released to forcefully drive the piston 404. The actuator 402 is used to limit the rate of movement of the piston 404. In an exemplary embodiment, the actuator 402 is a pneumatic actuator. However, other types of actuators may be used in alternative embodiments, such as a hydraulic actuator, and electronic actuator, and the like. In an exemplary embodiment, the actuator 402 may operate as a damper.

The piston 404 includes a drive rack 410 provided at an end of a piston rod 412 that is moved by the actuator 402. The drive rack 410 is operably coupled to the drive gear 250. Movement of the drive rack 410 between the retracted position and the extended position causes rotation of the drive gear 250. The rotation of the drive gear 250 causes rotation of the hinge arm 202 and thus the door gears 340. When the piston 404 of the emergency power assist assembly 400 is driven by the high-pressure gas, the piston rod 412 is retracted to translate the drive rack 410 in a linear direction, which forces rotational motion into the drive gear 250. In an exemplary embodiment, a guide roller 264 is provided to guide movement of the drive rack 410 between the retracted position and the extended position. The guide roller 264 presses the drive rack 410 into engagement with the drive gear 250. The guide roller 264 includes a concave or radial section that engages the drive rack 410 to vertically position the drive rack 410 and align the drive rack 410 with the drive gear 250. Other types of guide features may be used in alternative embodiments.

The emergency power assist assembly 400 is primarily used in emergency situations to provide force to assist opening the door 120 of the aircraft 100. For example, in emergency operation, if the inside door operating handle is actuated and the door structure is lifted beyond specified stops, the actuator 402 of the emergency power assist assembly 400 is operated to provide an opening assist force to drive the door 120 completely open very quickly. When activated, the emergency power assist assembly 400 forces the hinge arm 202 to open relative to the door 120 which causes the rotation at the door rotatable interface 126. Since the door rotatable interface 126 is operably coupled to the fuselage rotatable interface 130 via the programmable gear assembly 300, the overall result of the emergency power assist assembly 400 actuation is to drive the door 120 to the full open position.

In various embodiments, the emergency power assist assembly 400 can provide damping for the door motion during operations. For example, if the speed of the door opening or closing motions becomes too great, the impact when the door 120 reaches travel limits could cause damage. For that reason, the actuator 402 of the emergency power assist assembly 400 operates as a snubber feature to dampen, or restrict the speed of motion to an acceptable level.

Figure 10:
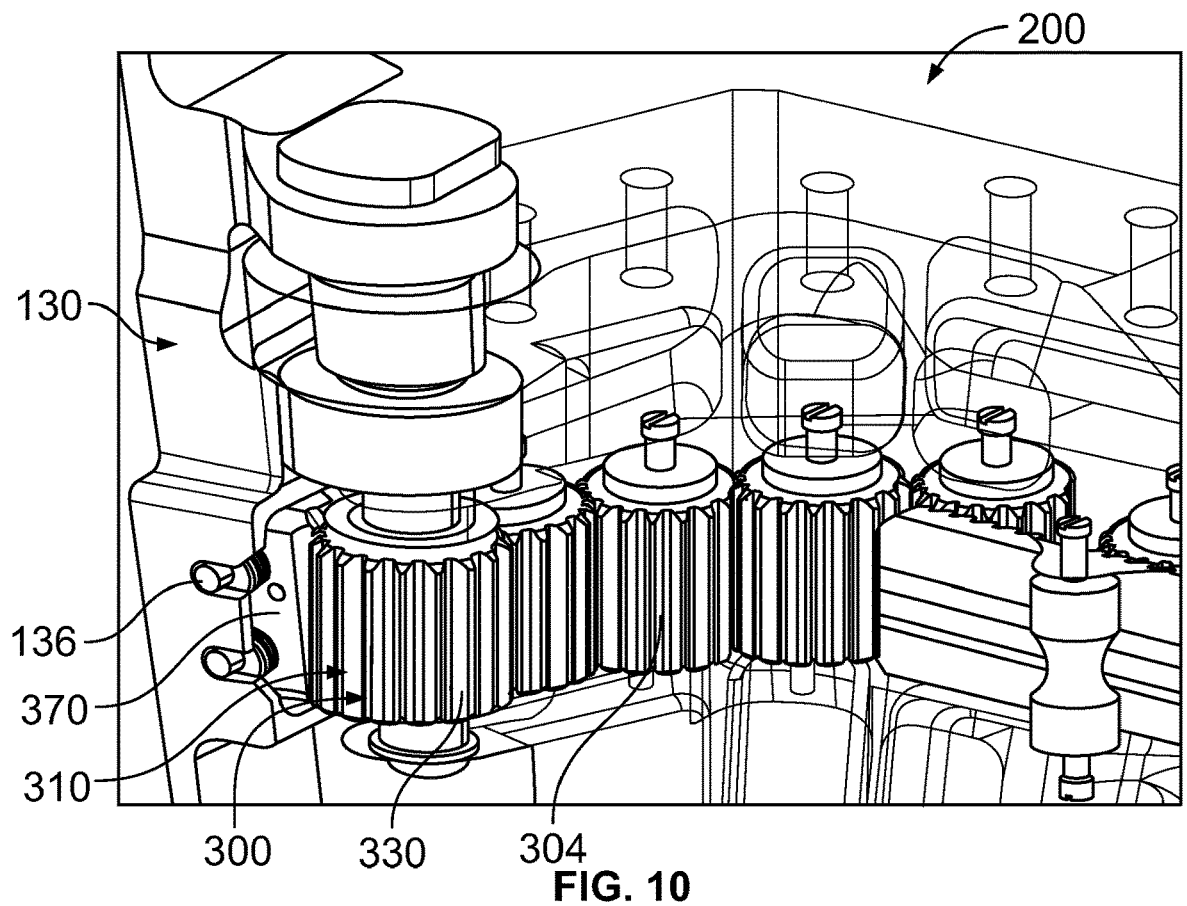
FIG. 10 is a rear perspective view of a portion of the hinge assembly in accordance with an exemplary embodiment showing the hinge assembly coupled to the fuselage rotatable interface.
Figure 11:
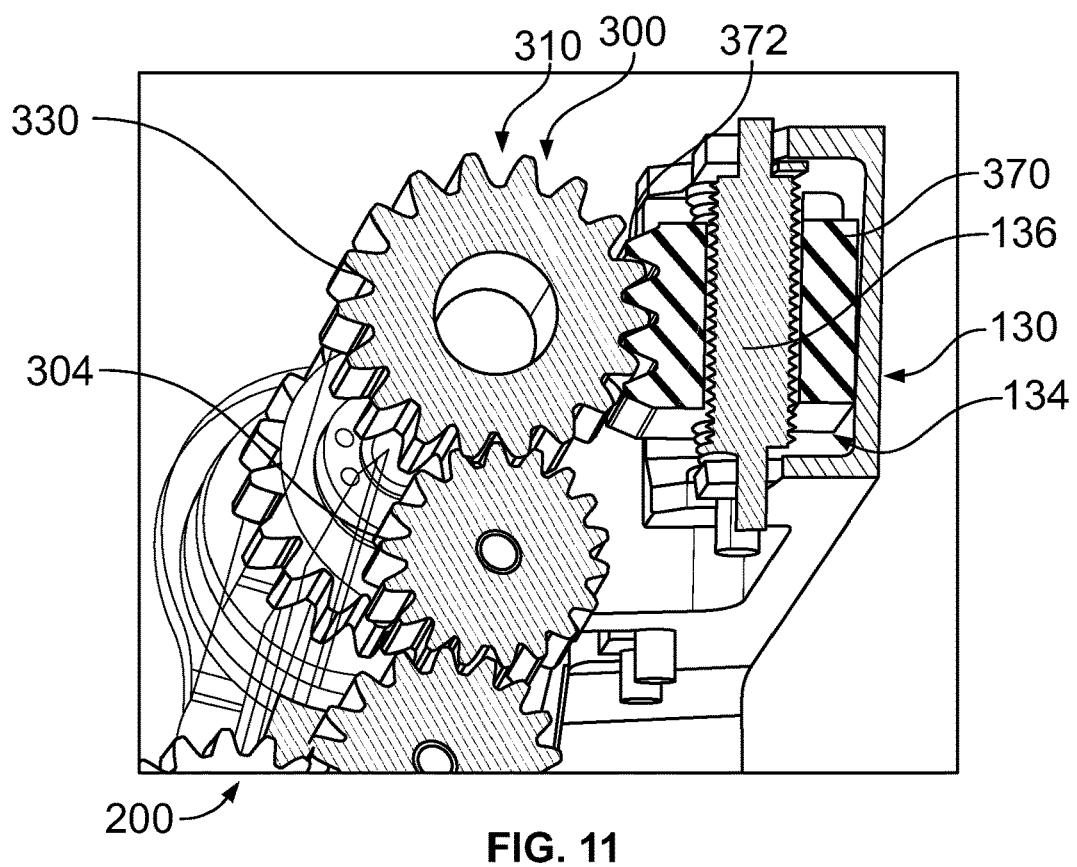
FIG. 11 is a sectional view of the hinge assembly in accordance with an exemplary embodiment showing the hinge assembly coupled to the fuselage rotatable interface.

FIG. 10 is a rear perspective view of a portion of the hinge assembly 200 in accordance with an exemplary embodiment showing the hinge assembly coupled to the fuselage rotatable interface 130. FIG. 11 is a sectional view of the hinge assembly 200 in accordance with an exemplary embodiment showing the hinge assembly coupled to the fuselage rotatable interface 130.

The fuselage rotatable interface 130 includes a pocket 134 that receives the fuselage rack 370. In an exemplary embodiment, the fuselage rack 370 is adjustable relative to the fuselage rotatable interface 130. For example, the pocket 134 is oversized relative to the fuselage rack 370. The fuselage rack 370 is movable within the pocket 134 to change relative positions of the fuselage rack 370 with respect to the fuselage rotatable interface 130. In an exemplary embodiment, the fuselage rack 370 is coupled to the fuselage rotatable interface 130 by a threaded bolt 136. The threaded bolt 136 may be rotated to adjust the relative position of the fuselage rack 370 within the pocket 134. The fuselage rack 370 may be adjusted for tensioning the programmable gear assembly 300, such as to control rigging of the door position and remove gear lash between the gears 304 of the programmable gear assembly 300. For example, movement of the fuselage rack 370 may cause clockwise or counterclockwise rotation of the fuselage gear 330 to tighten the gears 304 within the gear train 310 and remove any slop or gear lash within the programmable gear assembly 300. For example, gear teeth 372 of the fuselage rack 370 may engage the gear teeth of the fuselage gear 330 and sliding movement of the fuselage rack 370 causes rotation of the fuselage gear 330 to tighten or loosen the gear train 310. Optionally, both the upper and lower fuselage racks 370 may be adjusted to remove the gear lash within the system. If the upper and lower fuselage racks 370 are adjust in the same direction, the position (rotational alignment) of the door 120 within the fuselage cutout is modified to control rigging of the door position. By adjusting the racks 370 in the same direction, the door 120 is rotated relative to the hinge arm 202 to achieve proper alignment to the fuselage (aerodynamic fit & fair). If the upper and lower fuselage rack 370 members are adjust in the opposite direction, the gear trains are either 'stretched' or 'compressed' in a manner as to reduce eliminate gear lash, such as to reduce or eliminate small gaps or tolerances between each gear tooth to gear tooth throughout the entire gear train. In an exemplary embodiment, the fuselage racks 370 are initially adjusted in the opposite direction to reduce the gear lash in the system and therefore provide a tight rotational control of the door 120 relative to the hinge arm 202 and fuselage. With the gear trains tight, the two fuselage racks 370 may be adjusted in unison in the same direction to achieve door-to-fuselage fair for a smooth exterior surface.

Figure 12:
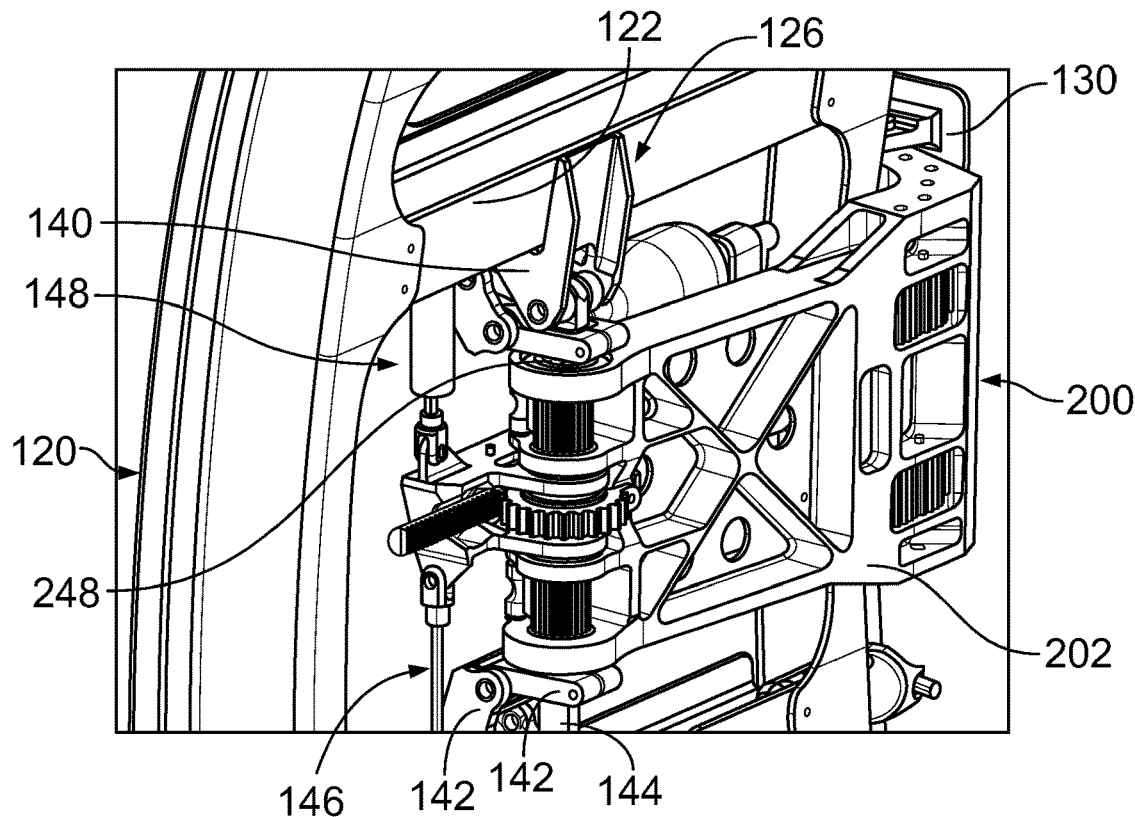
FIG. 12 is a front perspective view of the door assembly showing the hinge assembly coupled to the door rotatable interface of the door and the fuselage rotatable interface in accordance with an exemplary embodiment.
Figure 13:
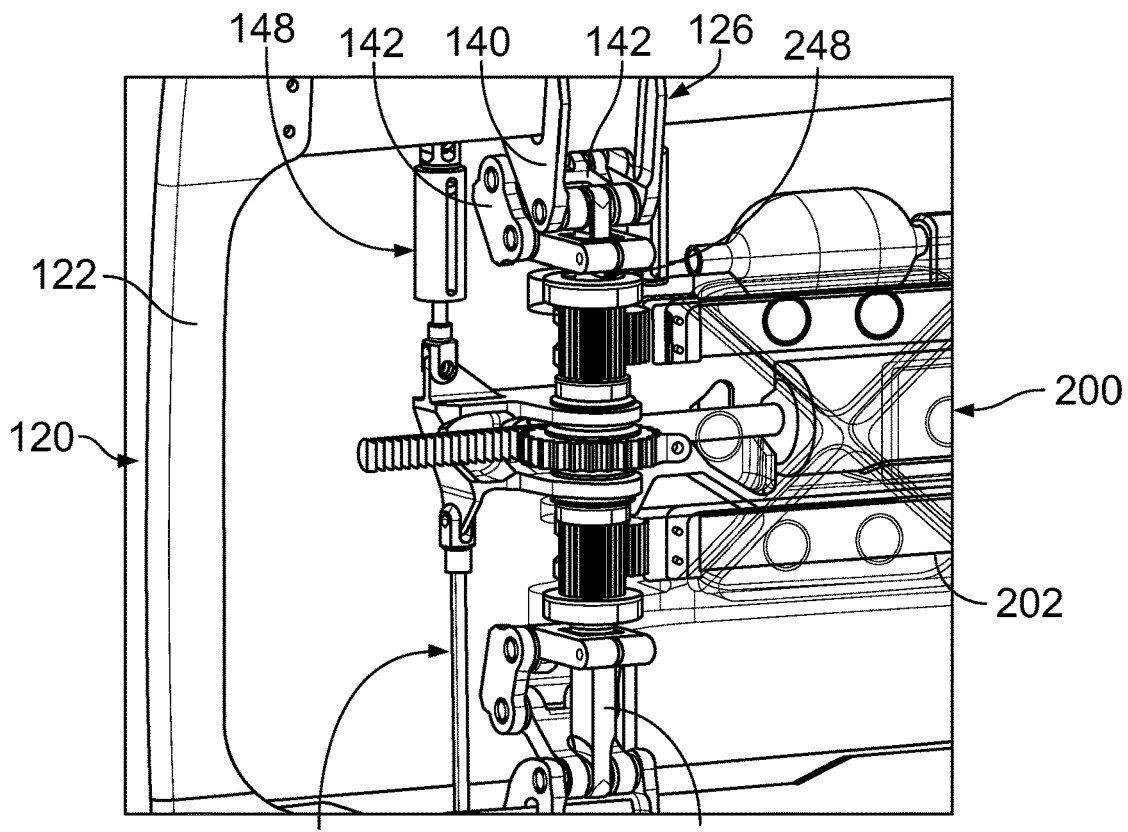
FIG. 13 is a front perspective view of a portion of the door assembly showing the hinge assembly coupled to the door rotatable interface of the door with the hinge arm shown in phantom to illustrate the components of the door assembly in accordance with an exemplary embodiment.

FIG. 12 is a front perspective view of the door assembly showing the hinge assembly 200 coupled to the door rotatable interface 126 of the door 120 and the fuselage rotatable interface 130. FIG. 13 is a front perspective view of a portion of the door assembly showing the hinge assembly 200 coupled to the door rotatable interface 126 of the door 120 with the hinge arm 202 shown in phantom to illustrate the components of the door assembly.

In an exemplary embodiment, door mounting brackets 140 are coupled to structural members of the door structure 122. The door mounting brackets 140 are rotatably coupled to the door guide rod 144. The hinge assembly 200 is rotatably coupled to the shaft 248. In an exemplary embodiment, the door mounting brackets 140 are rotatably coupled to the torque link assemblies 142 (for example, upper and lower torque link assemblies) to provide rotational control (for example, torque control) across a sliding and pivoting cylindrical joint. The torque link assemblies 142 are connected via a door guide rod 144 that slides within the shaft 248. Each torque link assembly 142 includes a plurality of torque links that are connected via pins. The door guide rod 144 slides freely within the shaft 248. The door guide rod 144 provides a strong structural link between the door 120 and the hinge arm 202. The joint between the door guide rod 144 and the shaft 248 allows two degrees of freedom (for example, rotation and sliding along an axis). Lift (for example, vertical sliding) between the door 120 and the hinge arm 202 is controlled by lift link mechanisms 146. Rotation between the door 120 and the hinge arm 202 is controlled by the torque link assemblies 142. The programmable gear assembly 300 controls the rotational position of the shaft 248. The door guide rod 144 is rotationally linked to the shaft 248 via the torque link assemblies 142. During door movement (for example, door opening or door closing), the rotational motion of the shaft 248 is transferred between the links of each torque link assembly 142 to the door frame. As such, torque from the programmable gear assembly 300 is transmitted to the door frame across the sliding joint that accommodates door lift. In an exemplary embodiment, a lift assist device 148 is provided to assist lifting the door 120 via spring force applied between the hinge assembly 200 and the door structure 122. For example, during opening, the door 120 may be initially moved vertically upward, such as approximately 2 inches, prior to swinging from the closed position to the open position. The lift assist device 148 may include a gas spring, mechanical spring, or powered lift device, such as an actuator and lift linkages coupled between the hinge assembly 200 and the door 120. The lifting of the door 120 allows the door to unseat from the fuselage 106 within the opening prior to swinging the door 120 to the open position.

Figure 14:
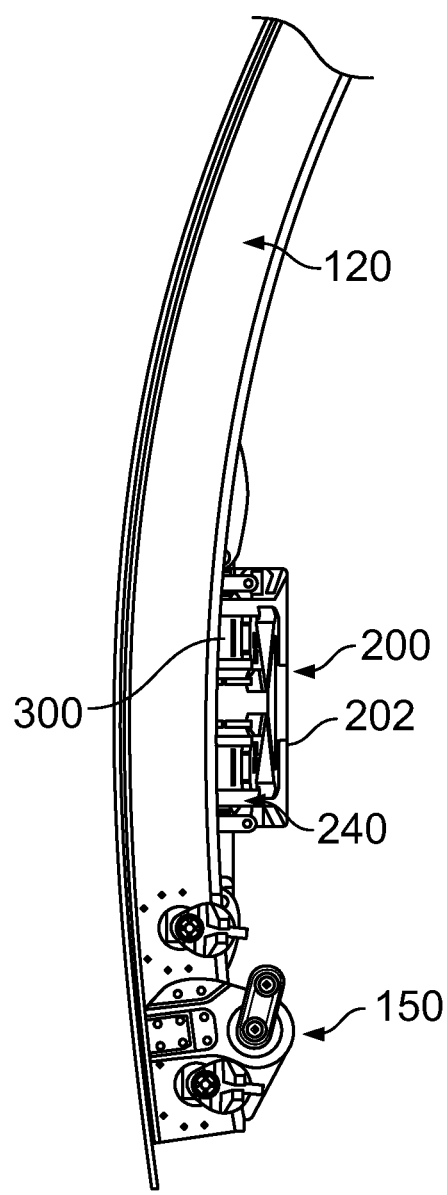
FIG. 14 is a side view of the door assembly showing the hinge assembly coupled to the door in accordance with an exemplary embodiment.
Figure 15:
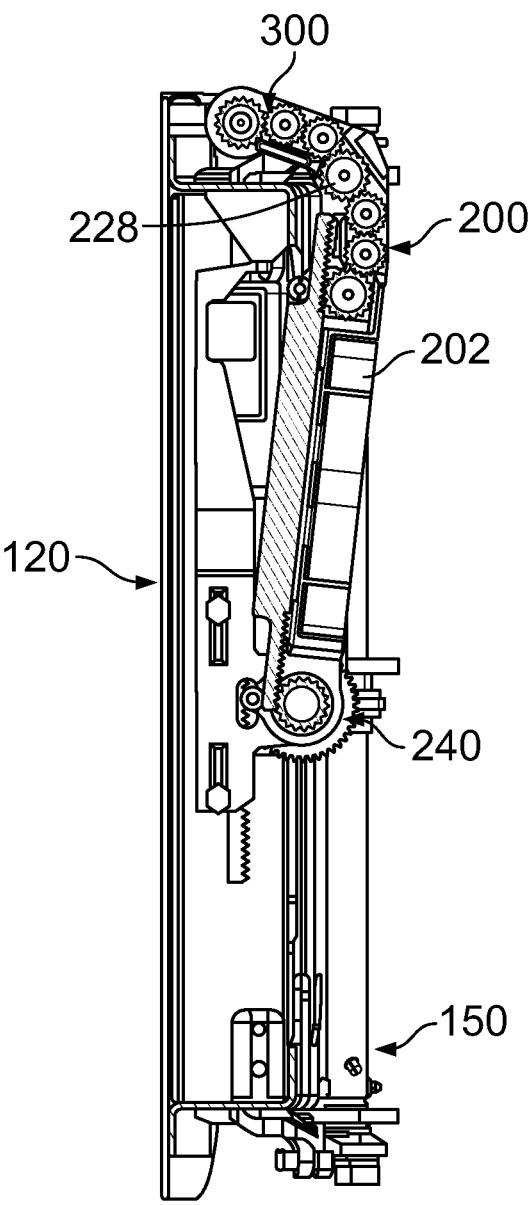
FIG. 15 is a top, sectional view of the door assembly showing the hinge assembly coupled to the door in accordance with an exemplary embodiment.

FIG. 14 is a side view of the door assembly showing the hinge assembly 200 coupled to the door 120 in accordance with an exemplary embodiment. FIG. 15 is a top, sectional view of the door assembly showing the hinge assembly 200 coupled to the door 120 in accordance with an exemplary embodiment. The hinge assembly 200 has a low-profile relative to the door 120 into the interior of the passenger cabin. The components of the programmable gear assembly 300 are contained within the profile of the hinge arm 202 so as to limit the space in the passenger cabin occupied by the hinge assembly 200 and allow room for other elements within the space adjacent the door 120, such as passenger seats or additional galley space. In the illustrated embodiment, the hinge assembly 200 protrudes a minor distance beyond a latch assembly 150 for the door 120, such as less than 3 inches beyond the latch assembly 150 for the door 120. In various embodiments, only at the corner 228 does the hinge assembly 200 protrude beyond the latch assembly 150 for the door 120. For example, at the door fitting 240 the hinge assembly 200 is contained within the envelope or footprint of the latch assembly 150.

Figure 16:
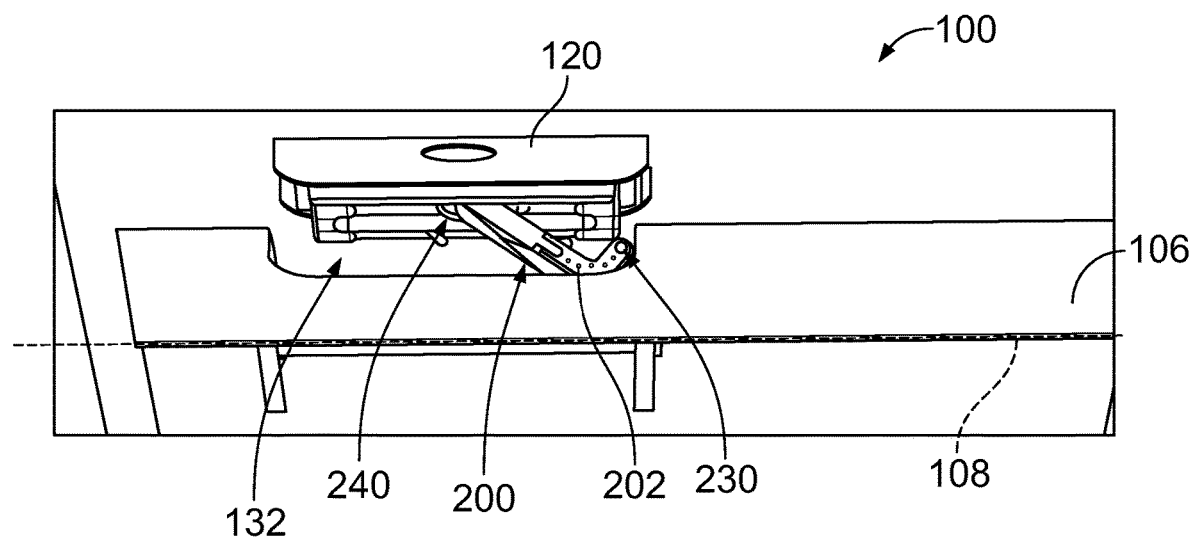
FIG. 16 illustrates the door assembly immediately after opening, just beyond a fully closed position in accordance with an exemplary embodiment.
Figure 17:
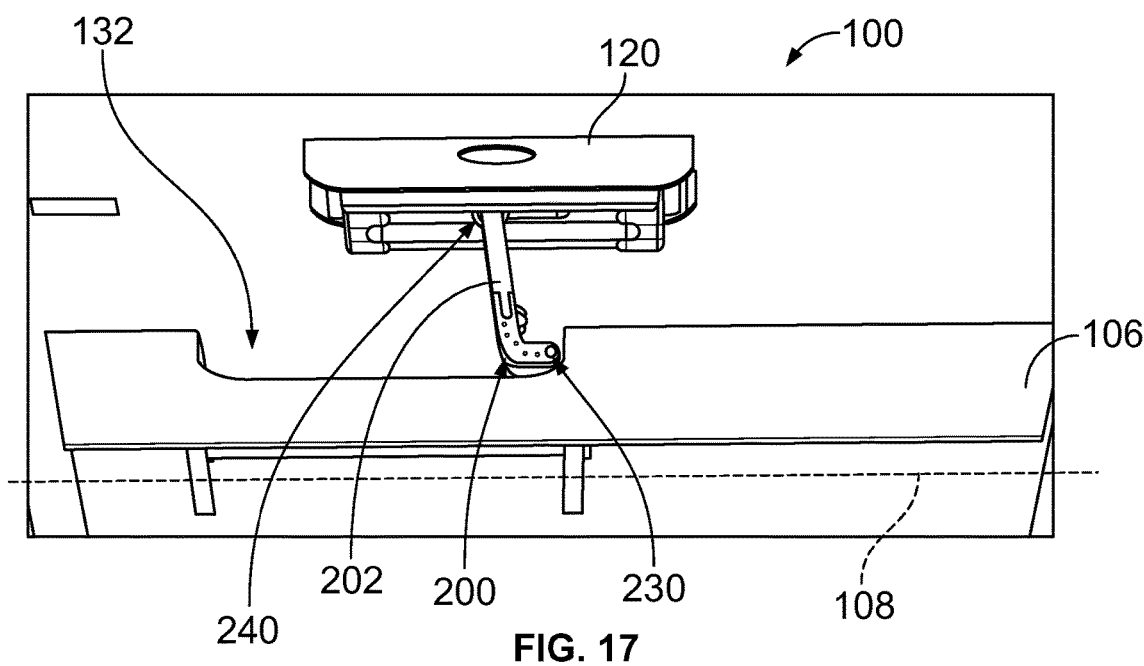
FIG. 17 illustrates the door assembly in a partially opened position showing the door near the maximum distance from the fuselage in accordance with an exemplary embodiment.
Figure 18:
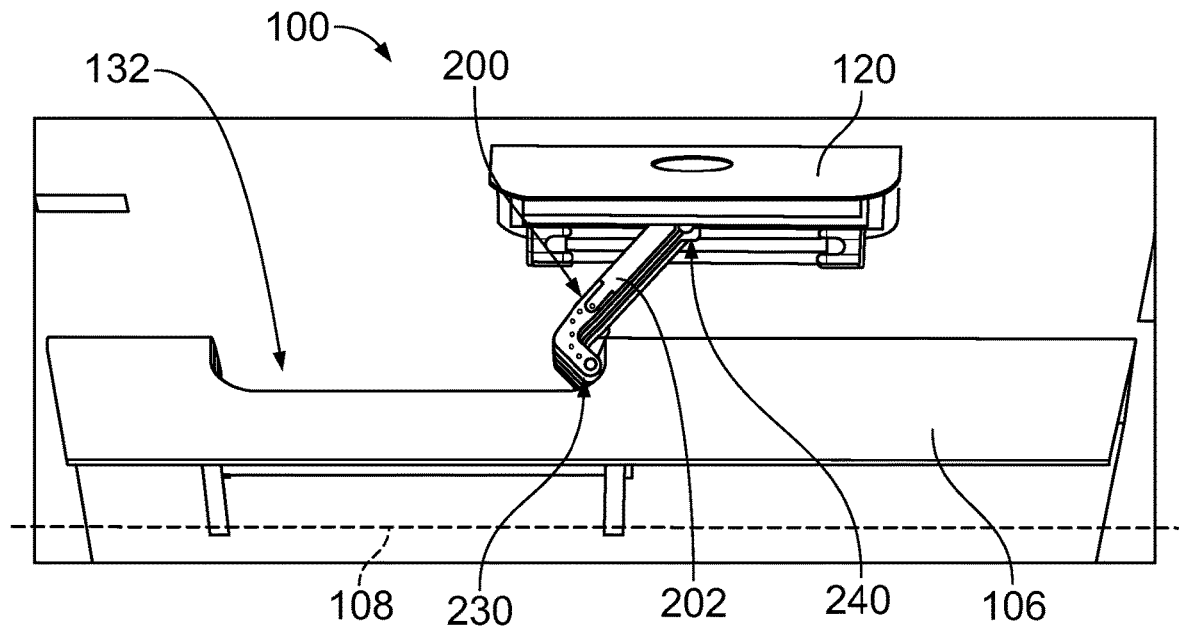
FIG. 18 illustrates the door in a partially open position showing the door retracted back toward the fuselage in accordance with an exemplary embodiment.
Figure 19:
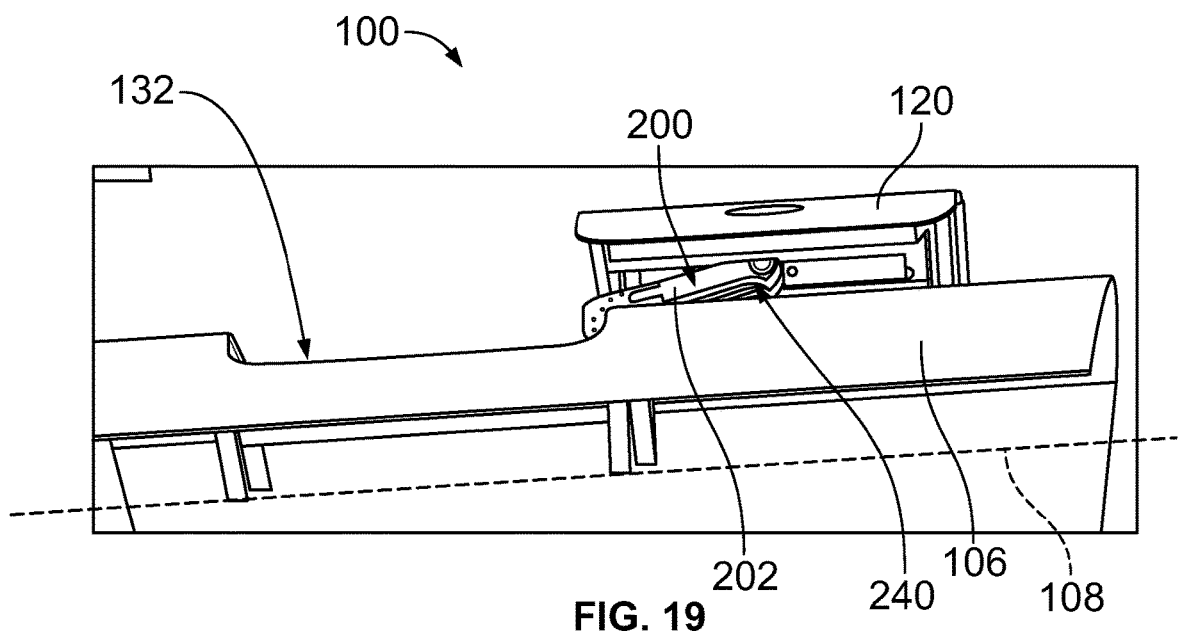
FIG. 19 illustrates the door in a fully open position in accordance with an exemplary embodiment.

FIGS. 16-19 illustrate an opening sequence for the door assembly. FIG. 16 illustrates the door assembly immediately after opening, just beyond a fully closed position. FIG. 17 illustrates the door assembly in a partially opened position showing the door 120 near the maximum distance from the fuselage 106. FIG. 18 illustrates the door in a partially open position showing the door 120 retracted back toward the fuselage 106. FIG. 19 illustrates the door in a fully open position. The hinge arm 202 rotates relative to the fuselage 106 from the fully closed position to the fully open position. The hinge assembly 200 maintains the orientation of the door 120 relative to the fuselage 106 through the range of motion. For example, the programmable gear assembly 300 causes the door 120 to maintain a generally parallel orientation relative to the longitudinal axis 108 of the fuselage 106 as the door moves from the closed position to the open position. However, changing gear ratios may allow angling of the door inward or outward, such as to follow a taper of the fuselage, in the open position. The gears 304 of the programmable gear assembly 300 rotate as the door 120 is moved from the closed position to the open position to control the orientation of the door 120 relative to the fuselage 106. The programmed or controlled rotation of the gears 304 maintains the door orientation. The shape of the hinge arm 202 allows the hinge arm 202 to wrap around the edge of the door opening 132 to position the door 120 forward of the door opening 132 in the open position.

During operation, the door 120 can be opened by manually rotating a door handle (not shown) to unlock door assembly, and manually applying a force to move the door 120 outward and forward. When the door 120 is opened, the hinge arm 202 rotates about the fuselage fitting 230 and the door fitting 240. The end of the hinge arm 202 is translated outward, causing the door 120 to be swung away from the door opening 132. The programmable gear assembly 300 controls the orientation of the door 120 around the pivot point at the fuselage fitting 230 and at the door fitting 240 as the door is opened and translated away from the fuselage 106. When the door is fully opened, the inside of the door 120 is adjacent the outer skin of the aircraft 100 while the door 120 has been translated out away from, and forward of, the door opening 132. When the door 120 is closed, the hinge assembly 200 is pulled in the opposite direction. As a result, the door 120 is translated in the opposite direction. Thus, when the door 120 is moved into the door opening 132, the door is correctly seated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A hinge assembly for connecting a door to a fuselage of an aircraft, the hinge assembly comprising:
    a hinge arm having a fuselage fitting at a first end and a door fitting at a second end, the fuselage fitting configured to pivotably couple to a fuselage rotatable interface mounted to the fuselage adjacent a door opening of the aircraft, the door fitting configured to pivotably couple to a door rotatable interface of the door; and
    a programmable gear assembly coupled to the hinge arm, the programmable gear assembly configured to allow the hinge arm to pivot around the fuselage fitting when the door is moved from a door closed position to a door open position, the programmable gear assembly further configured to cause the door to move along a programed path relative to the fuselage as the door moves from the door closed position to the door open position;
    wherein the programmable gear assembly includes a fuselage gear coupled to the fuselage fitting, a door gear coupled to the door fitting, and a rack operably coupled between the fuselage gear and the door gear, the programmable gear assembly including a first gear set at the first end, the first gear set including the fuselage gear, a rack drive gear, and at least one intermediary gear between the fuselage gear and the rack drive gear, wherein at least one intermediary gear transfers relative rotational motion of the fuselage gear to the rack drive gear, the rack drive gear engaging the rack to move the rack between a retracted position and an advanced position, the rack rotating the door gear as the rack moves between the retracted position and the advanced position.

2. The hinge assembly of claim 1, wherein the hinge arm is configured so that when the door is moved from the door closed position to the door open position the hinge arm is pivoted through the door opening and the door is laterally offset from the door opening.

3. The hinge assembly of claim 1, further comprising an emergency power assist assembly attached between the programmable gear assembly and the hinge arm so as to drive the door open in an emergency, and to limit the speed of the motion of the hinge arm when the hinge arm is moved between the door closed position to the door open position.

4. The hinge assembly of claim 1, wherein the fuselage gear is adjustable relative to the rack and the door gear for tensioning the programmable gear assembly.

5. The hinge assembly of claim 1, wherein the hinge arm includes a main body and an extension extending from the main body at a corner, the fuselage fitting provided at a distal end of the extension, the door fitting provided at a distal end of the main body.

6. The hinge assembly of claim 5, wherein the rack extends along the main body to the door gear at the distal end of the main body.

7. The hinge assembly of claim 1, wherein the programmable gear assembly is contained within a footprint of the hinge arm.

8. The hinge assembly of claim 1, wherein the rack is directly coupled to the door gear to rotate the door gear as the rack moves between the retracted position and the advanced position.

9. The hinge assembly of claim 1, wherein the first gear set extends along a curved gear path.

10. The hinge assembly of claim 1, wherein the fuselage gear and the rack drive gear have a common diameter.

11. The hinge assembly of claim 10, wherein the door gear has a common diameter as the fuselage gear and the rack drive gear.

12. The hinge assembly of claim 1, wherein the programmable gear assembly includes an upper gear train, a lower gear train, and a shaft between the upper gear train and the lower gear train, the shaft located at the second end of the hinge arm, the rack is an upper rack, the fuselage gear is an upper fuselage gear, and the door gear is an upper door gear, wherein the upper fuselage gear, the upper door gear, and the upper rack form portions of the upper gear train, the lower gear train including a lower fuselage gear coupled to the fuselage fitting, a lower door gear coupled to the door fitting, and a lower rack operably coupled between the lower fuselage gear and the lower door gear, wherein the upper door gear is connected to the lower door gear by the shaft.

13. The hinge assembly of claim 12, wherein the upper gear train is identical to the lower gear train.

14. The hinge assembly of claim 12, wherein the upper gear train is coupled to an upper portion of the hinge arm, the lower gear train coupled to a lower portion of the hinge arm and extending parallel to and spaced apart from the upper gear train.

15. The hinge assembly of claim 12, the lower gear train further comprising a lower rack drive gear and at least one lower intermediary gear between the lower fuselage gear and the lower rack drive gear, the lower rack drive gear engaging the lower rack to move the lower rack between a retracted position and an advanced position, at least one lower intermediary gear transferring relative rotational motion of the lower fuselage gear to the lower rack drive gear.

16. The hinge assembly of claim 12, wherein the upper fuselage gear is adjustable relative to the upper rack and the upper door gear and the lower fuselage gear is adjustable relative to the lower rack and the lower door gear for to remove gear lash in the programmable gear assembly.

17. The hinge assembly of claim 1, wherein the programmable gear assembly is configured to cause the door to maintain in a generally parallel orientation relative to a longitudinal axis of the fuselage as the door moves along the programed path between the door closed position and the door open position.

18. A hinge assembly for connecting a door to a fuselage of an aircraft, the hinge assembly comprising:
a hinge arm having a fuselage fitting at a first end and a door fitting at a second end, the fuselage fitting configured to be pivotably couple to a fuselage rotatable interface mounted to the fuselage adjacent a door opening of the aircraft, the door fitting configured to pivotably couple to a door rotatable interface of the door; and
a programmable gear assembly coupled to the hinge arm, the programmable gear assembly configured to allow the hinge arm to pivot around the fuselage fitting when the door is moved from a door closed position to a door open position, the programmable gear assembly further configured to cause the door to move along a programed path relative to the fuselage as the door moves from the door closed position to the door open position;
wherein the programmable gear assembly includes a fuselage gear coupled to the fuselage fitting, a door gear coupled to the door fitting, and a rack operably coupled between the fuselage gear and the door gear, the programmable gear assembly including a first gear set at the first end, the first gear set including the fuselage gear, a rack drive gear, and at least one intermediary gear between the fuselage gear and the rack drive gear, wherein at least one intermediary gear transfers relative rotational motion of the fuselage gear to the rack drive gear, the rack drive gear engaging the rack to move the rack between a retracted position and an advanced position, the rack rotating the door gear as the rack moves between the retracted position and the advanced position; and
wherein the fuselage gear is adjustable relative to the rack and the door gear for tensioning the programmable gear assembly.

19. The hinge assembly of claim 18, wherein the programmable gear assembly includes a fuselage rack coupled to a fuselage rotatable interface at the fuselage, the fuselage gear coupled to the fuselage rack, the fuselage rack being adjustable relative to the fuselage rotatable interface to adjust the position of the fuselage gear to tension the programmable gear assembly.

20. A hinge assembly for connecting a door to a fuselage of an aircraft, the hinge assembly comprising:
a hinge arm having a fuselage fitting at a first end and a door fitting at a second end, the fuselage fitting configured to be pivotably couple to a fuselage rotatable interface mounted to the fuselage adjacent a door opening of the aircraft, the door fitting configured to pivotably couple to a door rotatable interface of the door;
a programmable gear assembly coupled to the hinge arm, the programmable gear assembly configured to allow the hinge arm to pivot around the fuselage fitting when the door is moved from a door closed position to a door open position, the programmable gear assembly further configured to cause the door to move along a programed path relative to the fuselage as the door moves from the door closed position to the door open position, wherein the programmable gear assembly includes a fuselage gear coupled to the fuselage fitting, a door gear coupled to the door fitting, and a rack operably coupled between the fuselage gear and the door gear, the programmable gear assembly including a first gear set at the first end, the first gear set including the fuselage gear, a rack drive gear, and at least one intermediary gear between the fuselage gear and the rack drive gear, wherein at least one intermediary gear transfers relative rotational motion of the fuselage gear to the rack drive gear, the rack drive gear engaging the rack to move the rack between a retracted position and an advanced position, the rack rotating the door gear as the rack moves between the retracted position and the advanced position; and
an emergency power assist assembly attached between the programmable gear assembly and the hinge arm so as to drive the door open in an emergency, and to limit speed of the motion of the hinge arm when the hinge arm is moved between the door closed position to the door open position.

21. The hinge assembly of claim 20, wherein the emergency power assist assembly includes an actuator and a piston operably coupled to the actuator, the piston includes a drive rack and a drive gear rotated by the drive rack, the drive gear being coupled to the hinge arm, the actuator being operated to rotate the hinge arm to open the door.

\* \* \* \* \*